Figure 2:
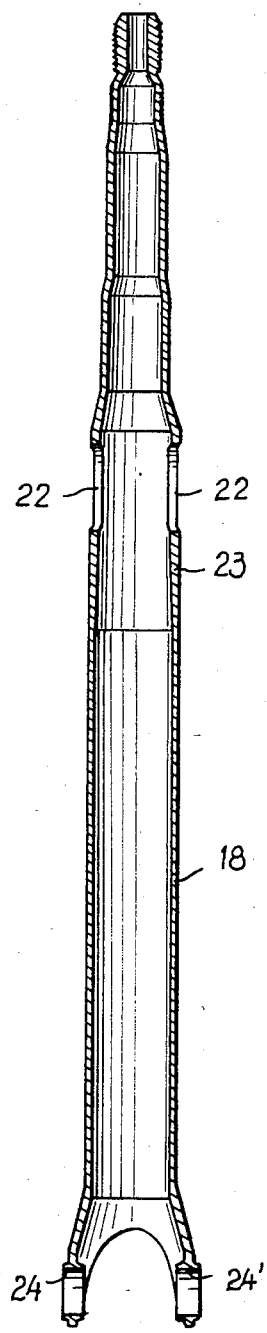

United States Patent [19]

Barnabe et al.

[11] Patent Number: 4,601,215

[45] Date of Patent: Jul. 22, 1986

[54] STEERING WHEEL SHAFT FOR A MOTOR VEHICLE STEERING COLUMN

[75] Inventors: Jean-Pierre Barnabe; Michel Clerc, both of Valentigney; Frédéric Mouhot, Voujeaucourt, all of France

[73] Assignee: Cycles Peugeot, Valentigney, France

[21] Appl. No.: 600,715

[22] Filed: Apr. 16, 1984

[30] Foreign Application Priority Data

Apr. 15, 1983 [FR] France .................................. 83 06232

[51] Int. Cl.⁴ .............................................. B62D 1/16
[52] U.S. Cl. .................................. 74/492; 29/DIG. 11; 29/DIG. 42
[58] Field of Search .......................... 74/492; 280/777; 29/DIG. 11, DIG. 41, DIG. 42, DIG. 43; 72/368, 378

[56] References Cited

U.S. PATENT DOCUMENTS

| | | | |
|---|---|---|---|
| 1,898,779 | 2/1933 | Klein | 29/DIG. 43 |
| 3,317,253 | 5/1967 | Loffler et al. | 74/492 |
| 3,504,568 | 4/1970 | Nakamura et al. | 74/492 |
| 3,735,463 | 5/1973 | Merola | 29/DIG. 11 |
| 3,760,650 | 9/1973 | Pardy | 74/492 |
| 3,826,124 | 7/1974 | Baksay | 72/378 |
| 3,835,725 | 9/1974 | Furusho et al. | 74/492 |
| 4,019,403 | 4/1977 | Kondo et al. | 74/492 |
| 4,185,880 | 1/1980 | Shiomi et al. | 74/492 |
| 4,274,299 | 6/1981 | Jones | 74/492 |

FOREIGN PATENT DOCUMENTS 0051574  3/1982  Japan .................................. 74/492

Primary Examiner—Alan Cohan
Assistant Examiner—John A. Rivell
Attorney, Agent, or Firm—Sughrue, Mion, Zinn, Macpeak and Seas

[57] ABSTRACT

This shaft is formed by a tube in a single piece having one end portion which is enlarged and cut away so as to constitute a universal joint yoke 5. A main cylindrical body 18 having a wall of reduced thickness connects this yoke to a portion 23 of greater wall thickness and provided with two slots 22 constituting a locking keeper. At the end of the shaft opposed to the yoke there is formed a steering wheel support constituted by a portion of the tube which has a smaller diameter and a greater wall thickness.

8 Claims, 2 Drawing Figures

STEERING WHEEL SHAFT FOR A MOTOR VEHICLE STEERING COLUMN

The present invention relates to a steering wheel shaft for a motor vehicle steering column.

In order to satisfy safety standards, steering columns are, at the present time, made in two parts which are pivotally connected to each other and comprise therefore a steering wheel shaft connecting the steering wheel to a universal joint, and a steering shaft extending from said joint to the steering box of the front wheels.

Consequently, the steering wheel shaft must perform three functions. It must receive a steering wheel so as to transmit the rotation thereof to the steering box, ensure the pivotal connection, i.e. carry a universal joint yoke, and be capable of cooperating with an antitheft lock so as to prevent the rotation of the steering wheel. These three functions are performed by three different elements so that the steering wheel shaft comprises a rod or tube, one of the ends of which is shaped so as to receive the steering wheel, there being mounted thereon the universal joint yoke and a sleeve provided with a slot and constituting a locking keeper.

The drawback of such a construction is that it is complicated to produce. Attempts to simplify construction have encountered problems concerning the requirements of weight, since the parts of a vehicle must be as light as possible and have the smallest possible overall size. Now, the locking sleeve must necessarily have a relatively large diameter and be sufficiently thick to cooperate with the lock and resist shear stresses exerted by the latter.

An object of the present invention is to overcome this problem by providing a steering wheel shaft in a single piece which is both capable of performing the three aforementioned functions and capable of resisting the locking forces without having a prohibitive weight.

The invention indeed provides a steering wheel shaft which is formed by a tube in a single piece which has a wall thickness and a diameter which vary along its length and which includes, between an enlarged end forming a universal joint yoke and a narrow end for receiving the steering wheel, at least one slot constituting a keeper for a locking device.

Preferably, the wall of the tube is rendered thinner by a drawing operation with an elongation of the tube between the universal joint yoke and the vicinity of the slot, while it is rendered thicker at the narrow end for supporting the steering wheel.

Such a tube thus combines the qualities of resistance to the forces to which it is subjected and the lightness required of an element of this type.

Figure 1:
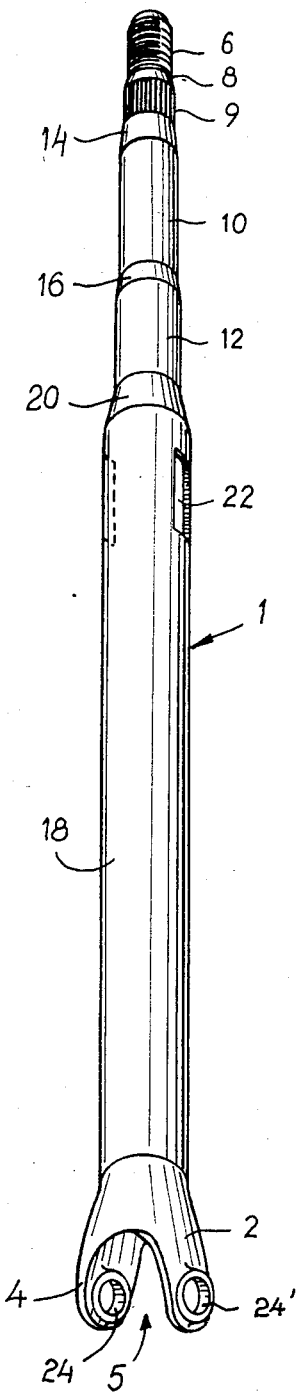

The advantages and features of the invention will be apparent from the following description of an embodiment of the invention which is given merely by way of example with reference to the accompanying drawings, in which:

FIG. 1 is a perspective view of a steering wheel shaft according to the invention, and FIG. 2 is an axial sectional view of this shaft or tube.

The steering wheel shaft shown in the drawing is constituted by a single piece, i.e. a tube 1 which has an enlarged end which is split for forming two branches 2 and 4 of a universal joint yoke 5. Projecting from branches 2 and 4 of this universal joint are spigots 24 and 24' which permit the mounting of a spider element and its bushes and moreover increase the resistance of the yoke as concerns torsion and bending stress. These spigots are produce for example by a piercing operation and a upsetting operation and in any case without addition of material.

At its opposite end, the tube is so shaped as to permit supporting the steering wheel. For example, in the illustrated embodiment, this tube terminates in a portion 6 of smaller diameter which is externally screwthreaded for the mounting of a nut holding the steering wheel in position on the tube. The screwthreaded portion 6 is followed by a frustoconical portion 8 which is connected to a splined cylindrical portion 9 for transmitting the rotating torque.

The tube 1 thereafter includes at least one cylindrical portion of a diameter which is larger than that of the splined portion 9 and, in the presently-described embodiment, two cylindrical portions 10 and 12 respectively which are interconnected and connected to the splined portion 9 by frustoconical portions 14 and 16 respectively, the portion 14 performing the function of an abutment for the steering wheel. Further, the main body of the tube 1 is constituted by a cylindrical portion 18 of larger diameter than the foregoing portions and which, in the vicinity of a conical portion 20 connected to the cylindrical portions 12 and 10, is provided with an intermediate portion defining at least one longitudinally extending slot 22, or alternatively two diametrally opposed slots, as shown in FIG. 2.

The different portions of the tube 1 have wall thicknesses which are also different. Thus, as shown in FIG. 2, the cylindrical tube 18 has a relatively small thickness relative to the thickness of the branches 2 and 4 of the universal joint yoke or relative to the thickness of the intermediate portion 23 of this tube which is provided with the slots 22. Further, the cylindrical portions 10 and 12, the splined portion 9 and screwthreaded portion 6 have thicker walls. Owing to this arrangement, the tube has a relatively low weight and great strength, and in particular a sufficient shear resistance in the vicinity of the locking slots 22.

Preferably, the steering wheel shaft is made from a cylindrical tube having a constant wall thickness and a constant diameter which is first of all deformed, or more precisely enlarged, and split for producing the two branches 2 and 4 of the yoke 5 without modifying the thickness of the initial tube. This tube 1 is then drawn in such manner as to elongate the portion intended to constitute the cylindrical portion 18 by rendering the wall thickness thinner, the region intended to form the cylindrical portion 23 provided with the slots 22 substantially retaining its initial wall thickness, so that these slots can be formed in a tube having great strength. The tube shaped in this way is provided with a narrowed end portion for supporting the steering wheel by means of a diameterreducing operation effected with a drawing of its wall while subjecting it to a lateral compression which elongates the tube and increases the thickness of its wall. The elongation and the compression are different in the different regions 12, 10, 9 and 6 of the metal tube.

The steering wheel shaft obtained in this way has variable strengths in its various parts. The narrow end portion having a thick wall easily supports the steering wheel which is mounted thereon. The portion 23 of large diameter and medium thickness resists shear stresses exerted by the lock, while the cylindrical portion 18 which has a thin wall essentially performs the function of a transmission of the rotation of the steering wheel to the yoke 5 of the universal joint.

It is found that, despite the reduction in thickness and the deformation that the initial tube 1 undergoes, i.e. in particular an elongation which may be as much as 50%, the steering wheel shaft produced gives, in torsion tests, results which are better than the steering wheel shafts in three parts which are made at the present time. Further, the portion 23 provided with the slots 22 has a distinctly greater shear resistance than that required by safety standards.

This steering wheel shaft in one piece thus meets the requirements in practice and is easy and cheap to produce.

Although the shaft has been shown with an end portion for supporting the steering wheel having a screwthreaded portion 6 followed by a splined portion 9, it will be understood that this has been given merely by way of example and that this end portion of the steering wheel-shaft could be formed by a cylindrical portion of constant diameter, the steering wheel being fixed in position by welding or any other suitable means.

What is claimed is:

1. A steering wheel shaft for a motor vehicle steering column, said shaft comprising a tube in a single piece which has a wall thickness and an outside diameter which vary along the length of the tube and which includes a main body portion of given outside diameter, an enlarged end portion constituting a universal joint yoke, a narrow end portion for fixing a steering wheel, and at least one slot constituting a locking keeper in an intermediate portion between said main body portion and said narrow end portion.

2. A steering wheel shaft according to claim 1, wherein the tube has an outside diameter which increases from said narrow end portion to said yoke.

3. A steering wheel shaft according to claim 1, wherein the tube has two of said slots in diametrically opposed relation.

4. A steering wheel shaft according to claim 1, wherein said main body portion of the tube is a cylindrical portion having a wall thickness which is less than the wall thickness of said enlarged end portion and the wall thickness of said intermediate portion.

5. A steering wheel shaft according to claim 1, wherein the tube has a wall of increased thickness in said narrowed end portion relative to the thickness of the wall of said intermediate portion.

6. A steering wheel shaft according to claim 1, said tube being initially a cylindrical tube having constant diameter and wall thickness, said tube being merely enlarged in said enlarged end portion for forming said universal joint yoke but elongated and reduced in wall thickness as a result of a drawing operation in said main body portion of the tube between said universal joint yoke and said intermediate portion defining said at least one slot.

7. A steering wheel shaft for a motor vehicle steering column, said shaft comprising a tube which is in a single piece and has a main body portion of given outside diameter, an enlarged end portion which is enlarged relative to said main body portion and constitutes a universal joint yoke, a narrow end portion for fixing a steering wheel, said narrow end portion being narrowed relative to said main body portion, and an intermediate portion between said main body portion and said narrow end portion and defining at least one slot constituting a locking keeper for cooperation with a lock, said tube being initially a cylindrical tube of constant wall thickness and having been subjected to axial drawing and lateral compressing operations which impart to said initially cylindrical tube a wall thickness of said main body portion which is less than the wall thickness of said enlarged end portion and less than the wall thickness of said intermediate portion, and a wall thickness of said narrow end portion which is greater than the wall thickness of said intermediate portion.

8. A steering wheel shaft according to any one of the preceding claims, wherein the universal joint yoke has branches and spigots in said branches for mounting a spider element and bushes for the spider element and for increasing the strength of the yoke branches, said spigots being an integral part of said branches without addition of component parts.

* * * * *